Feb. 6, 1934.  A. G. BELDEN ET AL  1,945,588
AUTOMATIC CAM GRINDING MACHINE
Filed April 16, 1932      10 Sheets-Sheet 4
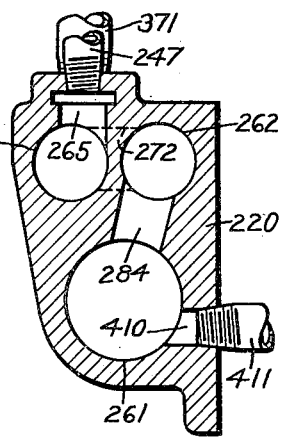
FIG.12
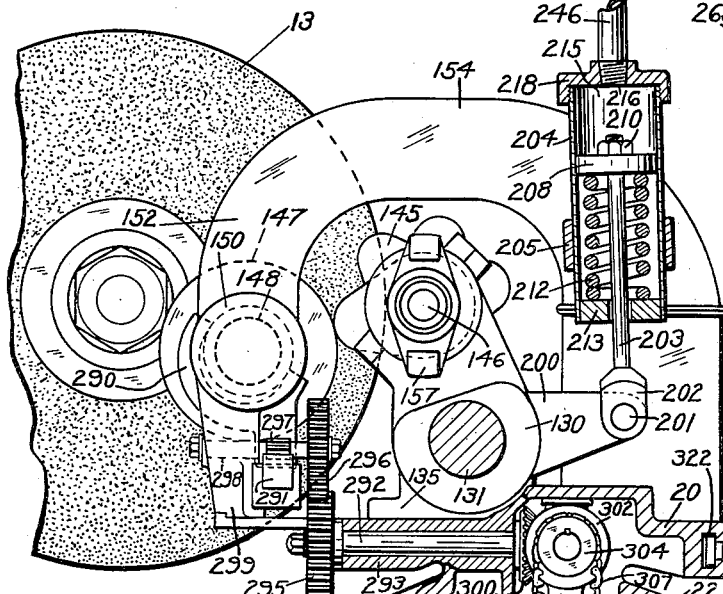
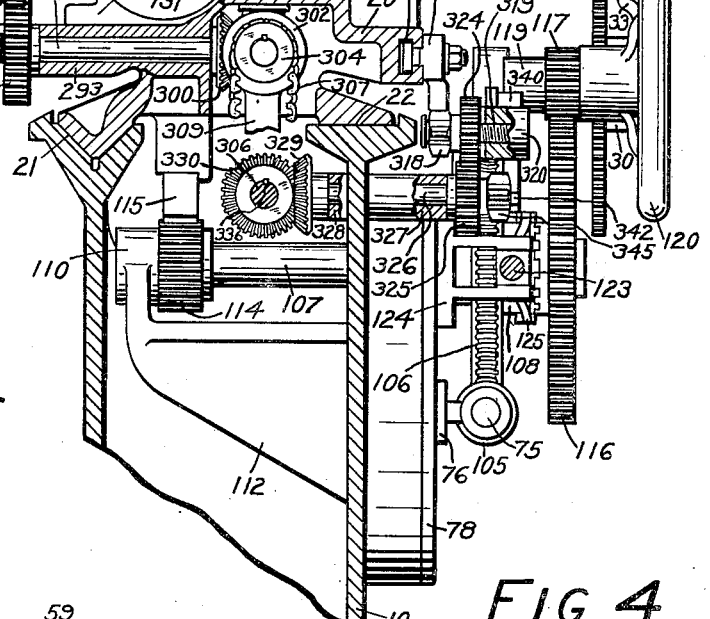
FIG.4
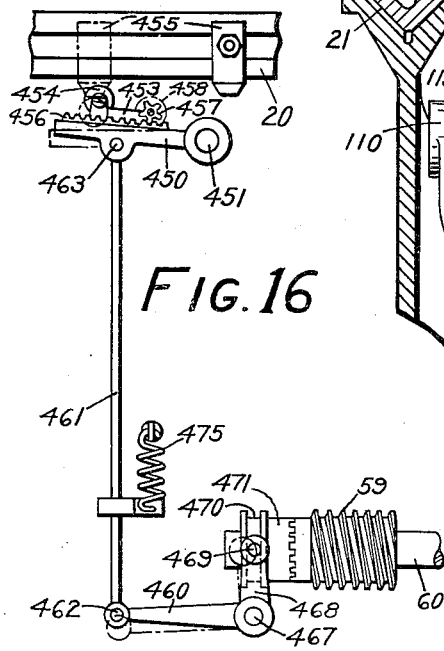
FIG.16
WITNESSES
W R Greenwood
Harold W. Eaton
INVENTORS
ALBERT G. BELDEN
CHARLES G. TREFETHEN
BY
Clayton L. Jenks
ATTORNEY

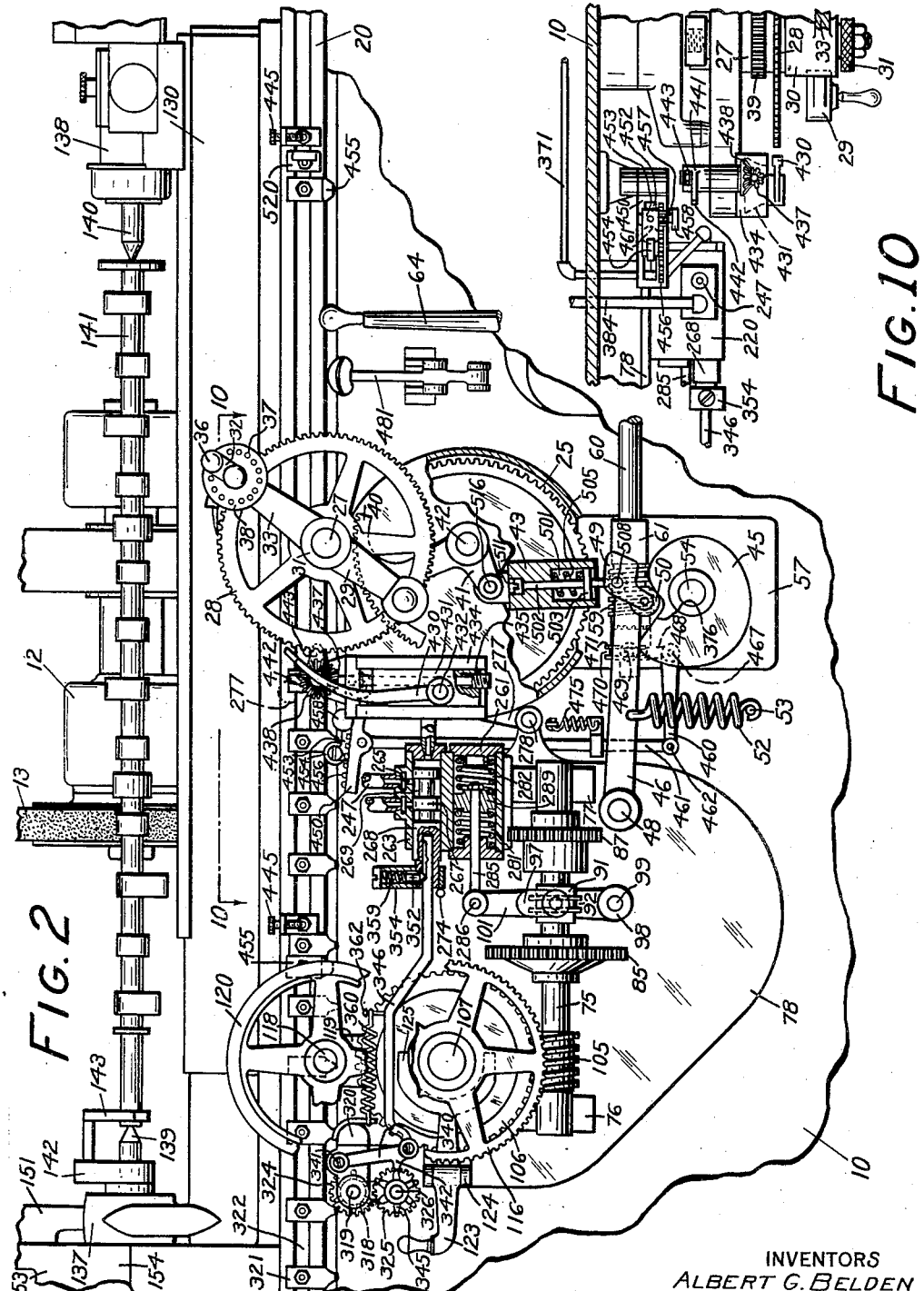

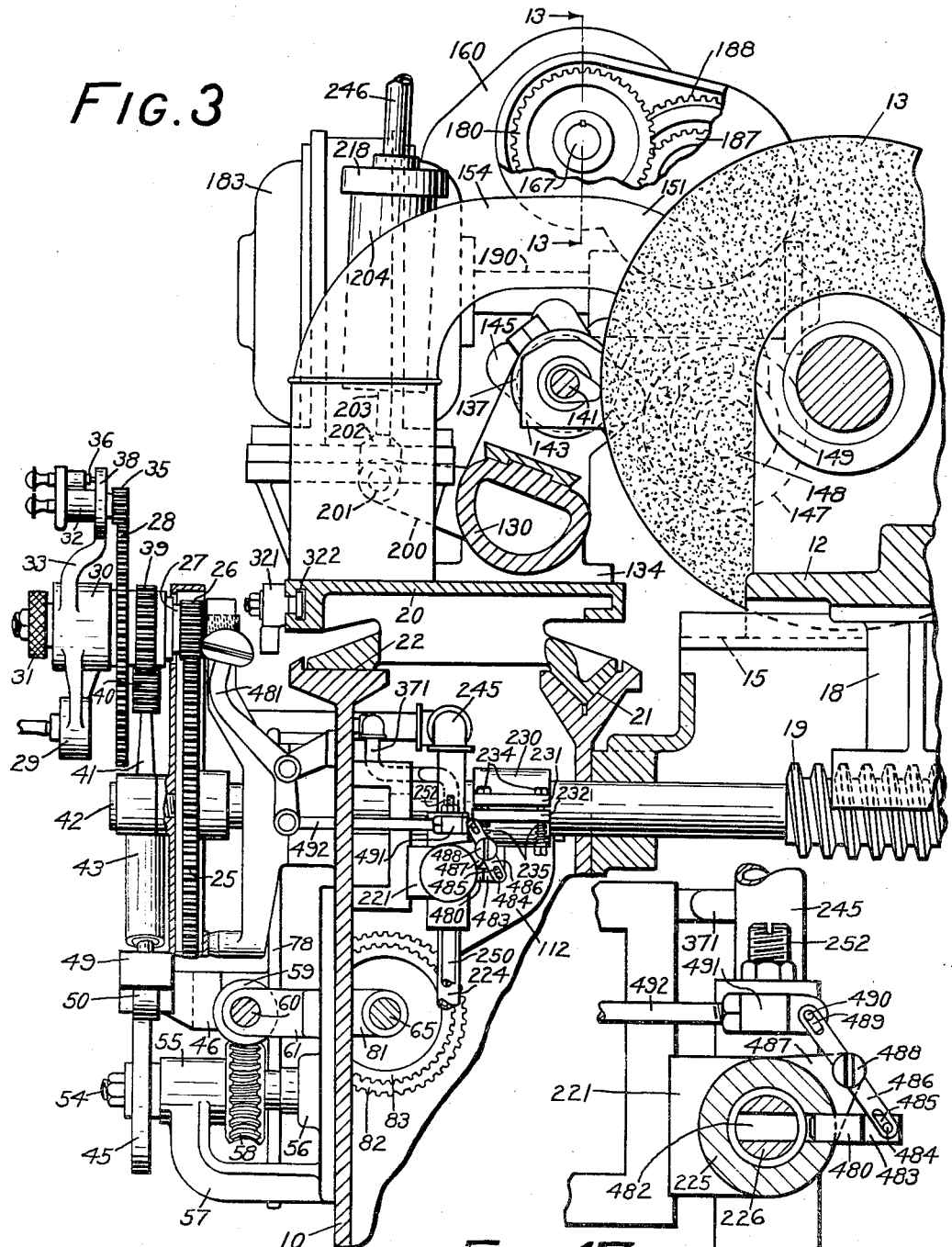

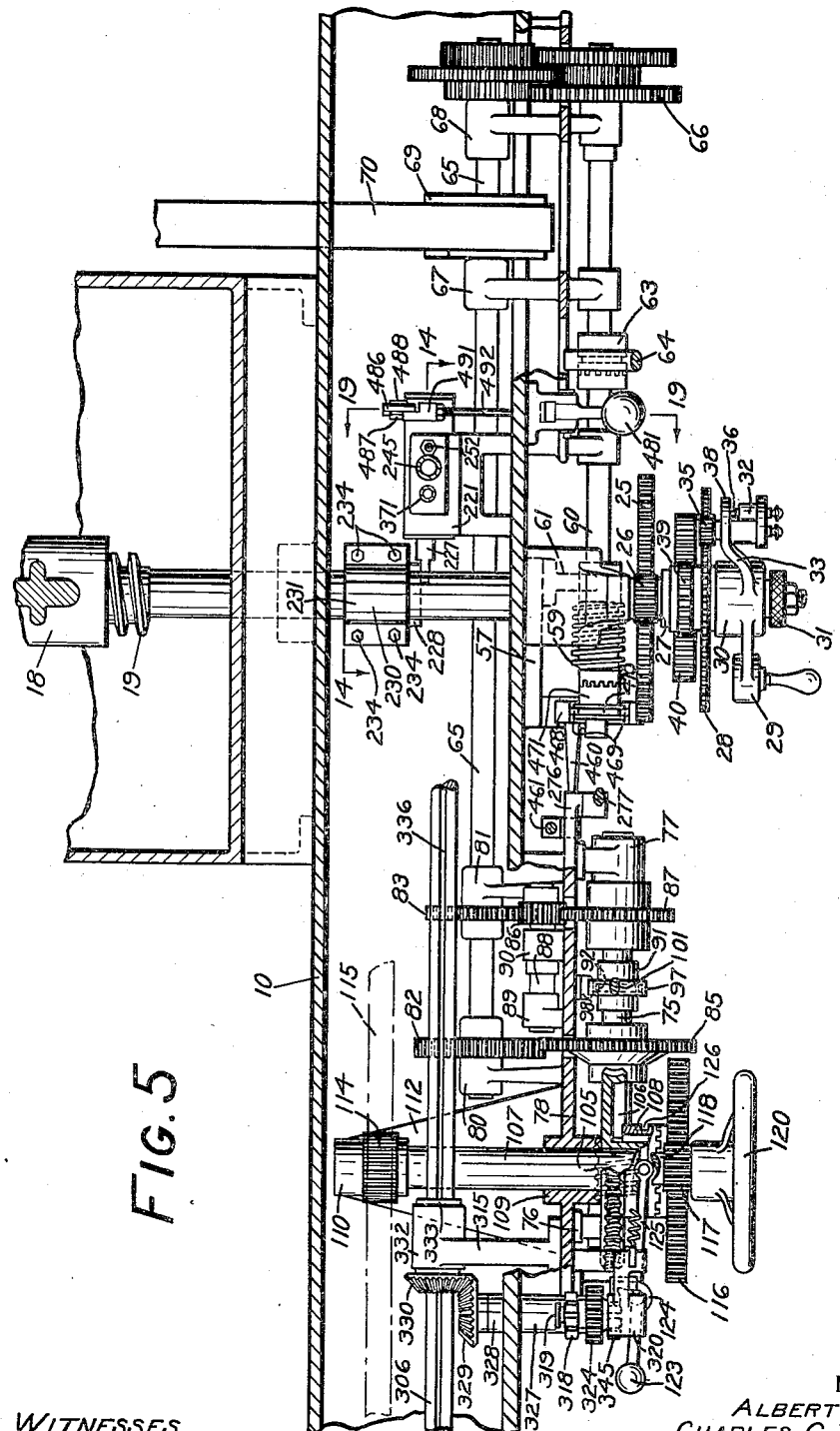

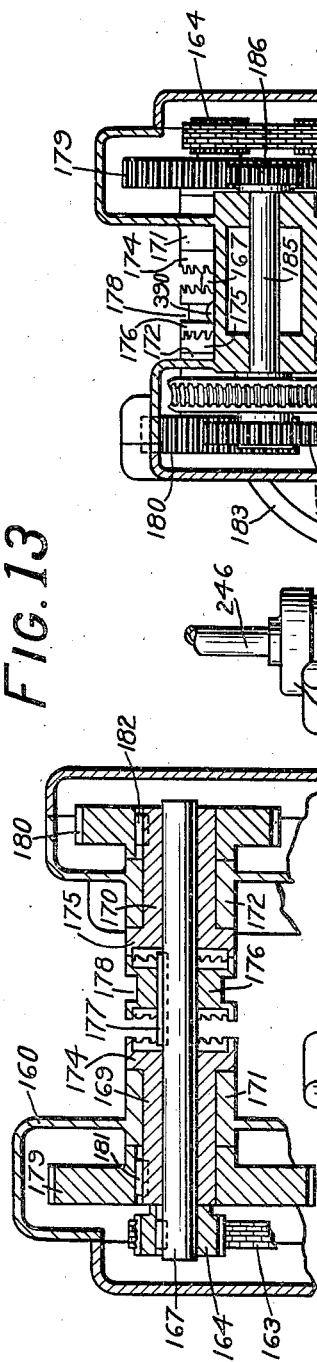

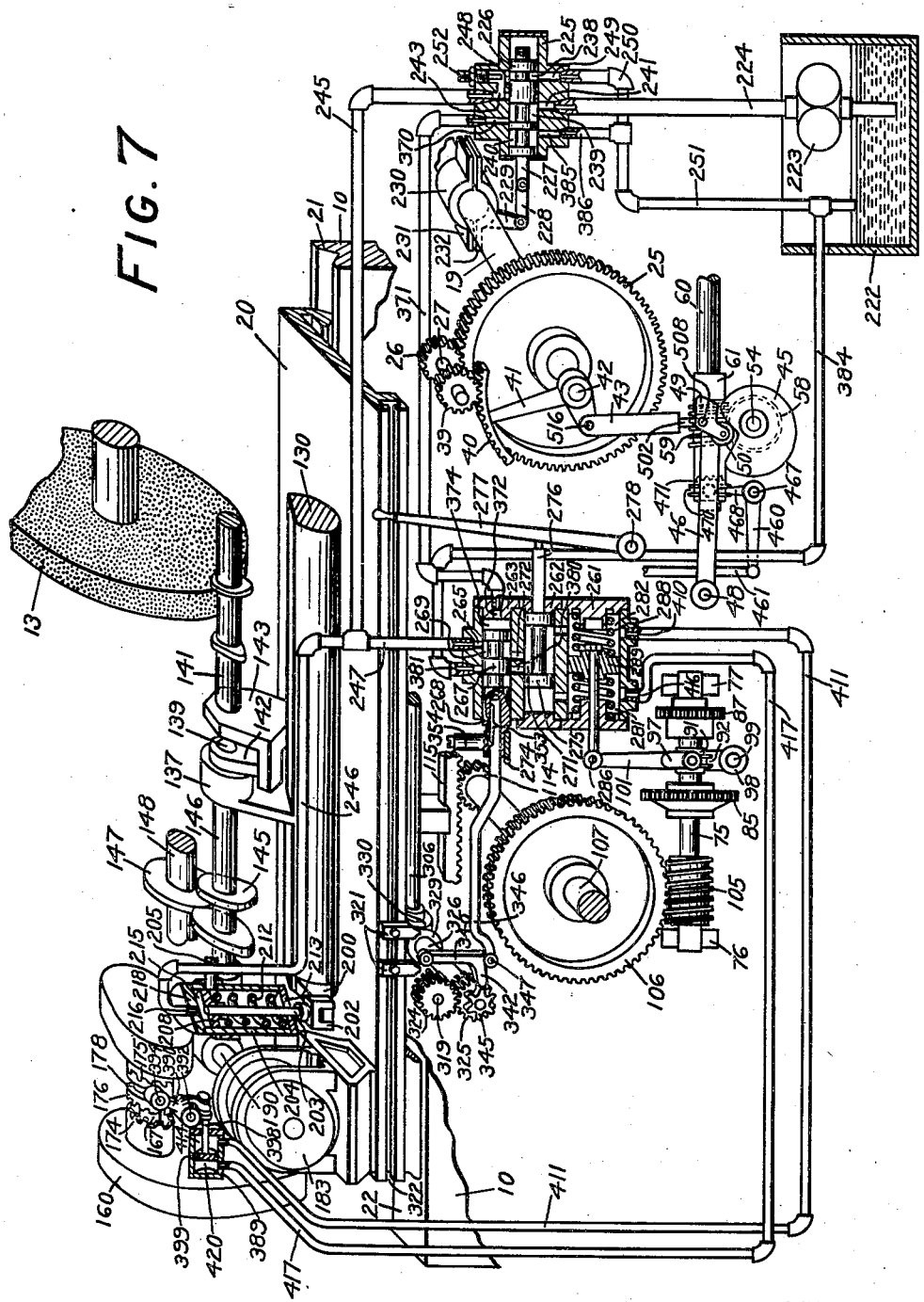

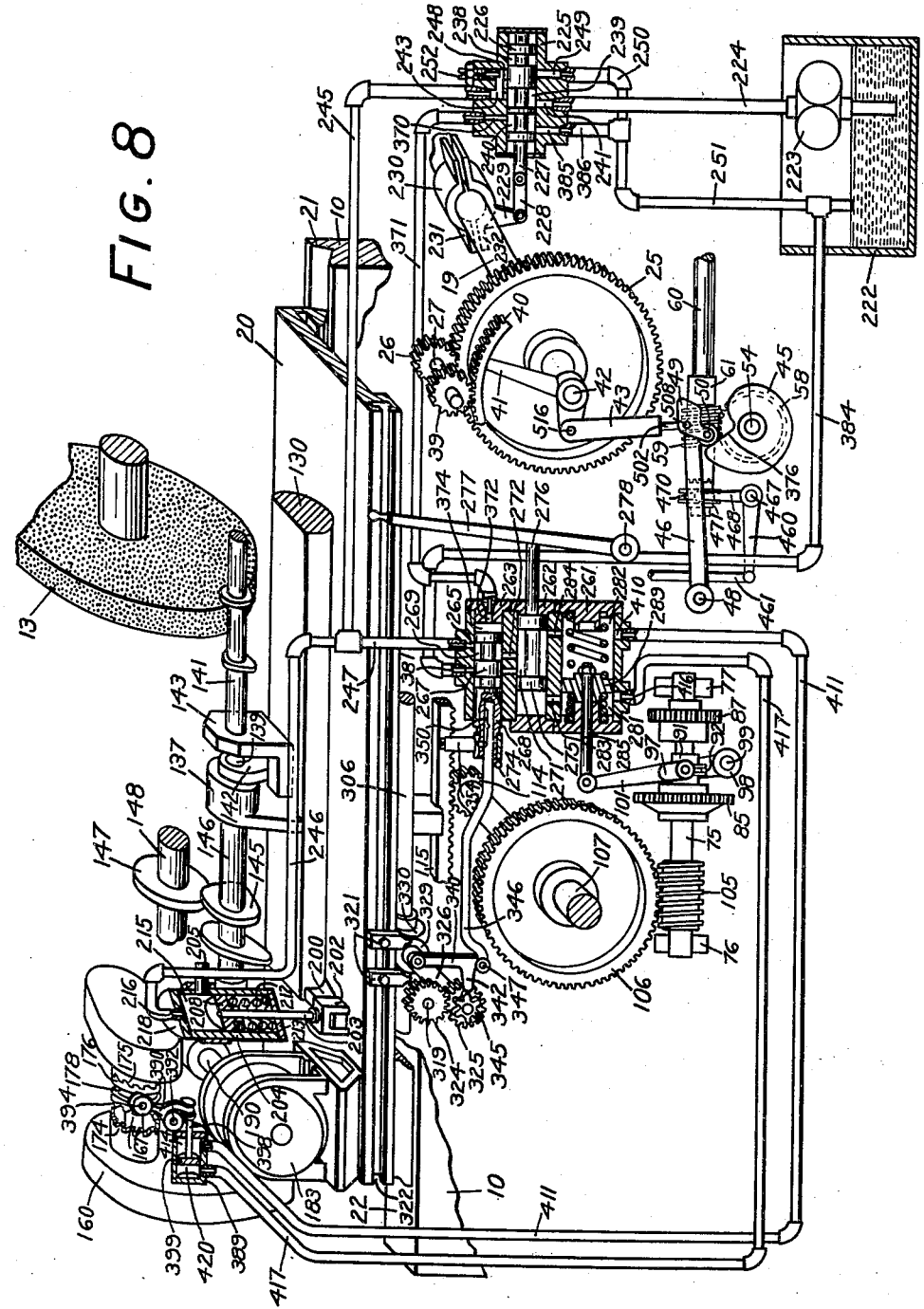

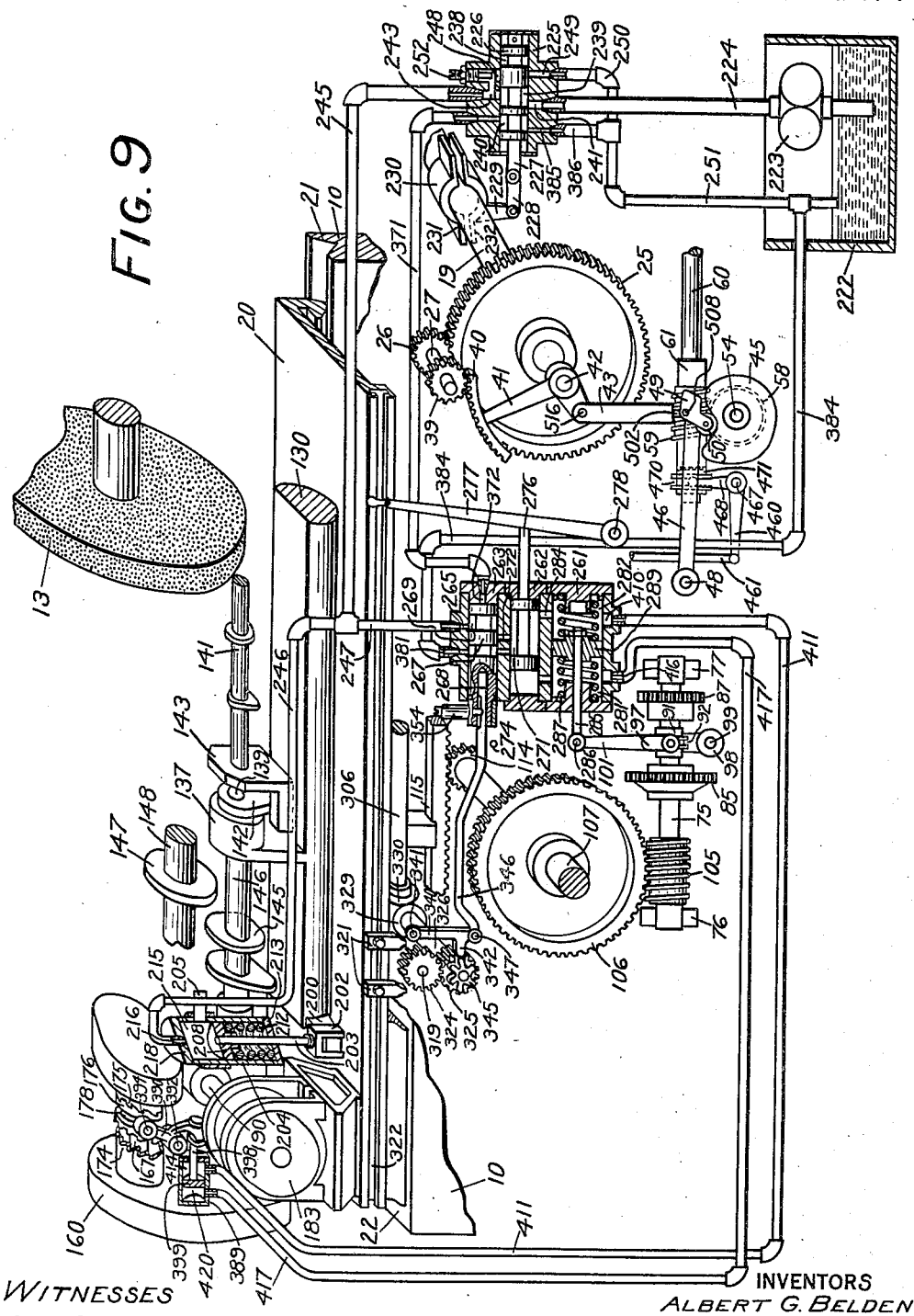

Feb. 6, 1934.  A. G. BELDEN ET AL  1,945,588
AUTOMATIC CAM GRINDING MACHINE
Filed April 16, 1932   10 Sheets-Sheet 10

WITNESSES
W. R. Greenwood
Harold W. Eaton

INVENTORS
ALBERT G. BELDEN
CHARLES G. TREFETHEN
BY Clayton L. Jenks
ATTORNEY

Patented Feb. 6, 1934

1,945,588

UNITED STATES PATENT OFFICE 1,945,588

AUTOMATIC CAM GRINDING MACHINE

Albert G. Belden and Charles G. Trefethen, Worcester, Mass., assignors to Norton Company, Worcester, Mass., a corporation of Massachusetts Application April 16, 1932. Serial No. 605,708

32 Claims. (Cl. 51—101)

This invention relates to grinding machines, and more particularly to an automatic grinding machine for grinding work having a plurality of spaced portions or grinding stations.

In the grinding of crankshafts, cams and work of similar nature which have a multiplicity of spaced portions to be ground, it has been the practice heretofore to support the work for rotation on suitable centers and cause the grinding wheel and work to move relatively toward and from each other to shape the portion during which operation the wheel is fed into the portion to first rough and then finish grind it to the ultimate size, shape and finish before operating on the next portion. These operations are jointly performed on each of the succeeding portions until they have all been ground to the desired shape and size after which the operator manually removes the work piece from the supporting centers and inserts therebetween the next rough piece to be ground. During the grinding of the previous piece, the table has usually been manually traversed from headstock to footstock by means of a hand wheel mounted upon the base of the machine. While the table is at the end of its travel, a second work piece is positioned between the centers and ground in the inverse order with the table movement in the opposite direction. The manual operation of positioning the work table for each grinding station, feeding the wheel during grinding and regulating the speed of work rotation during the rough and finish grinding is slow and involves a considerable loss in time, particularly in the quantity production of such work pieces where many are successively ground in the same machine.

One difficulty experienced with the prior machines is that the rough grinding of a portion involves the use of a heavy infeed of the wheel into the work thereby causing the wheel to become glazed or loaded and worn away rapidly and it is so employed in this condition to finish grind the portion to its ultimate size and shape. Consequently, such practice is not only detrimental to the work finish but also necessitates frequent truing and repeated feeding adjustments by the operator to compensate for the wheel wear in order that each of the successive portions when ground will be identical in size.

It is an object of this invention to overcome such difficulties and to increase production when a work piece, such as a camshaft, having a large number of spaced portions is to be ground by providing a machine which may be fully or partially automatic in operation and thereby require but little attention on the part of the operator.

A desirable type of automatic grinding machine is one which is so arranged that the work may be placed between work supporting centers and thereafter rotated during the grinding operation, in the course of which it is automatically rocked relatively toward and from the grinding wheel and the grinding wheel fed thereto to effect the desired results. The blank portions on the work piece should be ground successively to the approximate size and shape by automatically feeding the grinding wheel through a predetermined distance, then withdrawing it therefrom in a like manner and traversing the table automatically in timed relation to the wheel movement to place a fresh portion in position to be ground. To feed the wheel into the work, move them relatively during grinding and traverse the work to place a new portion in position for grinding requires a mechanism which goes through a definite and invariable cycle and which will produce uniform and duplicate results repeatedly. In such a machine, the operator need only to place the rough work piece in the machine and remove the finished piece thereafter making slight adjustments from time to time to compensate for any wearing of the grinding wheel.

A further object is to provide an automatic grinding machine in which a work piece having a multiplicity of spaced portions is successively rough ground and then finish ground in the inverse order and to provide a mechanism for this purpose which will be coordinated in timed relation with the wheel feeding movement.

Another object is to provide a grinding machine in which successive portions of a work piece are rough ground to the approximate size and shape during the traversing movement of the work in one direction after which they are finish ground to the precise size when traversed in the reverse direction.

It is a further object to provide a power driven cam grinding machine which will successively rough grind a plurality of work blanks on a work piece during the traverse of the work table in one direction and to operate in finish grinding the same work blanks to size and shape in their inverse order during the traversing movement of the table in the reverse direction until all have been ground.

It is another object of this invention to provide a cam grinding machine in which the separate movable mechanisms in the machine are controlled simultaneously by a central fluid pressure device so as to operate in timed relation with the grinding wheel movement to and from the work piece.

It is a still further object of this invention to provide a cam grinding apparatus which will serve to automatically feed the grinding wheel toward and from the successive product cam stations and to traverse the table in timed relation with said wheel feeding movement and in addition to automatically change the speed of work rotation upon the reversal of the direction of table traverse.

It is a further object to provide a grinding machine in which the work is traversed past the wheel to a series of grinding positions by an independent power mechanism automatically controlled and operated in timed relation with the wheel movement so that it is merely necessary for the operator to apply power by means of a single control device whereupon each grinding operation proceeds to completion and the work traverse is thereafter automatically effected.

Another object of this invention is to provide an automatic control mechanism operating in timed relation with the table movement for changing the speed of the work rotation when the table has reached a predetermined position.

Another object of this invention is to provide fluid pressure control devices synchronized by a central control device which will start and stop the power traversing mechanism and the work positioning mechanism and control the work rotation.

With these and other objects in view, as will be apparent to one skilled in the art, this invention resides in the combination of parts set forth in the accompanying description and covered by the claims appended hereto.

Referring to the drawings in which like reference numerals indicate like parts:

Fig. 2 is a fragmentary front elevation, on an enlarged scale, showing the feeding and traversing mechanism with parts broken away and shown in section to more clearly show the driving connection;

Fig. 3 is a cross-sectional view, on an enlarged scale, taken approximately on the line 3—3 of Fig. 1, showing the wheel feeding mechanism;

Fig. 4 is a cross-sectional view, on an enlarged scale, taken approximately on the line 4—4 of Fig. 1, showing the indexing mechanism for the master cam roller and the wheel feed mechanism;

Fig. 5 is a fragmentary horizontal sectional plan view, on an enlarged scale, through the machine to show the table driving and the wheel feeding mechanisms;

Fig. 6 is a fragmentary rear view, on an enlarged scale, of the headstock having parts broken away and shown in section to more clearly show the work drive and the master cam roller indexing mechanism;

Fig. 7 is a diagrammatic view showing the relative positions of the parts during the grinding operation when the grinding wheel is fed toward the work piece;

Fig. 8 is a similar diagrammatic view showing the relative positions of the parts when the table is traversed and when the wheel feed mechanism is rotated to move the grinding wheel rearwardly;

Fig. 9 is a diagrammatic view showing the relative positions of the parts at the instant the table traverse is stopped and with the wheel at its most rearward position and on the point of being fed toward the work;

Fig. 10 is a fragmentary horizontal sectional plan view taken approximately on the line 10—10 of Fig. 2;

Fig. 12 is a sectional view through the table traverse control valve;

Fig. 13 is a longitudinal sectional view taken approximately on the line 13—13 of Fig. 3;

Fig. 16 is a diagrammatic view, on an enlarged scale, of the automatic stop mechanism for the grinding machine; and Fig. 17 is a cross-sectional view on an enlarged scale taken approximately on the line 19—19 of Fig. 5.

Figure 1:
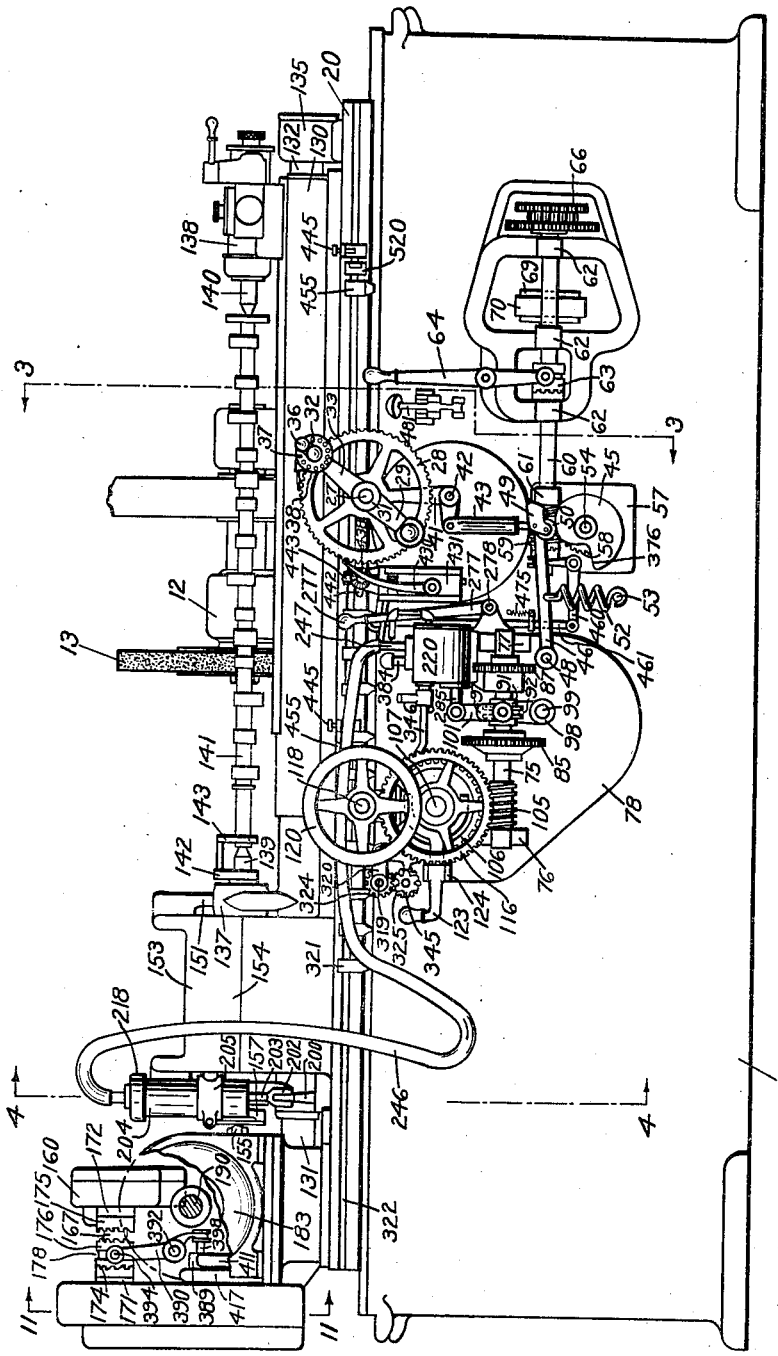
Fig. 1 is a front elevation of the grinding machine showing one embodiment of this invention.

In the preferred construction, a grinding machine is illustrated in which a work piece having a multiplicity of spaced portions or blanks is placed by the operator between work supporting centers on the movable table for rotation on the centers during grinding. After the machine is set in operation by the operator, the grinding operation is performed automatically without further attention on his part until it is completed and the various mechanisms automatically cease functioning whereupon the work piece is removed and a fresh piece is placed in position. The work table is arranged for intermittent movement in one direction to move the work piece to a succession of predetermined grinding stations to rough grind the portions and to automatically reverse after the last portion has been ground and traverse in reverse direction to finish grind these portions in the inverse order back to the starting position. An automatic mechanism is provided whereby the work is rotated at the proper speed for rough grinding and then automatically changed to a slower speed of rotation for finish grinding when the table is traversed to a predetermined position.

In accordance with one phase of this invention, a grinding machine is provided in which the work is rotatively supported and the grinding wheel is fed positively through a predetermined distance to grind the work to a given size. This feeding operation may be accomplished by means of a feed mechanism, and preferably a cross feed screw and micrometer device, which is power operated and is controlled by a power driven cam. The work and the grinding wheel are mounted for relative movement past each other to a series of grinding positions by means which comprise a power traverse mechanism which is independent of the wheel feed mechanism. This operation may be made automatic by employing means which act in timed relation with the wheel feed movement and preferably during the retreating movement of the wheel from the work. The power mechanism for effecting this traversing movement may be suitably applied to and disconnected by means of a clutch and the clutch may be operated, as in the particular form illustrated, by means of a fluid pressure device which is controlled automatically by the wheel feed mechanism. The work is preferably mounted on a pivoted support which rocks toward and from the grinding wheel to secure the desired contour on the work and it is connected to a fluid pressure mechanism which operates to move the support to an inoperative position.

The work is preferably supported and rotated by a spindle which is arranged to be positively rotated by a two-speed power mechanism which is independent of the wheel drive. The work rotation may be changed from one speed to the other when the grinding operation has been completed by means which act in timed relation with the table movement when the table has reached a predetermined position. This may be accomplished by means of a power driving mechanism including a two-speed clutch for the work rotating spindle which is preferably operated by means of a fluid pressure device which is controlled automatically by the table movement.

The fluid pressure devices are preferably so arranged that when the grinding wheel leaves contact with the work, the fluid supply is automatically transmitted to the various fluid pressure devices so that their movements are suitably timed and synchronized by the operation of a central control device. The preferred construction utilizes a source of fluid pressure, such as oil, and a valve mechanism is arranged to transmit such fluid to the operating chambers of piston and cylinder devices connected with the clutches and the pivoted work support. This central control device may comprise a valve operated in timed relation with the wheel feed movement and preferably by means of a friction device operated in timed relation with the wheel feeding mechanism.

The specific embodiment of this invention, as illustrated in the drawings, comprises a machine for automatically grinding the blanks on a camshaft in which power is utilized to operate the table traversing mechanism, the rotatable work support and the work rotation. This invention contemplates an apparatus in which a main control valve is provided to operate the associated movable mechanisms of the machine in timed relation with the movement of the wheel feeding mechanism. In the preferred construction, the grinding wheel feeding mechanism comprises a cross feed screw and a cam mechanism in which the latter is continuously operated through an invariable cam cycle to move the wheel toward and from the work piece. This improved construction provides a fluid pressure control mechanism that will function in response to the slightest change in the direction of angular movement of the feed screw in either direction to control the time of movement of the mechanisms for moving the work toward and from the grinding wheel and traversing the work to a new grinding position.

As illustrated in the drawings, a grinding machine is provided having a base 10 carrying a wheel slide 12 which supports a rotatable grinding wheel 13. The slide 12 is mounted on a V-way 15 and a flat-way (not shown) on the base 10 and is adapted to be moved by means of a half-nut 18 engaging a cross feed screw 19 which is rotatably supported in the base. The base 10 also supports a work table 20 which is arranged to slide longitudinally therealong on a V-way 21 and a flat-way 22.

Wheel feeding mechanism

In order that the grinding wheel 13 may be moved toward and from the work piece, the feed screw 19 is provided with a gear 25 meshing with a gear 26 on one end of a shaft 27. The other end of the shaft 27 carries a toothed feed wheel 28 securely fastened thereto whereby the cross feed screw may be rotated manually from the front of the machine by means of a crank arm 29. The arm 29 carries a hub 30 which is loosely sleeved on a reduced extension of the shaft 27 and it is held in place by means of a releasable nut 31. This arm is adjustably connected to the shaft 27 by means of a micrometer adjusting device 32 carried by an arm 33 also formed on the hub 30 and diametrically opposed to arm 29. This construction permits the arm 29 to be moved about the feed wheel 28 and locked in an adjusted position on the wheel as desired to positively limit the infeed of the grinding wheel at a predetermined point. The details of this micrometer adjusting device are similar to those shown in the patent to Norton No. 762,838 of June 14, 1904, the pinion 35 being mounted for axial movement into and out of engagement with the toothed wheel 28 and for rotation to angularly adjust it on the wheel. A spring pressed plunger 36 cooperates with a hole 37 in the index plate 38 to lock the pinion in an adjusted position. In order that the feed screw may be moved by power, a gear 39 formed integral with the hub of the feed wheel 28 meshes with a sector gear 40 carried by an arm of a bell crank lever 41. The bell crank lever 41 is pivotally mounted on a stud 42 secured to the protective housing surrounding the gears 25 and 26 and it is arranged to be moved by means of a yieldable connecting rod 43 and a cam mechanism.

Cam mechanism for driving the feed screw

The feed screw is rotated by a mechanism including a cam and a follower operatively connected to the feed screw, which is so constructed and arranged to rotate the feed screw in opposite directions through a definite distance and at a predetermined rate as controlled by the contour and speed of rotation of the cam, so that the grinding wheel moves repeatedly through the same path and cycle of advance and retreat. The embodiment illustrated comprises a follower which is actuated by a power driven cam 45.

To transmit the motion of the cam 45 so as to control the movement of the feed screw, a lever 46 (Figs. 1, 2, 3, 7, 8 and 9) is pivotally mounted on a pivot 48 on the base of the machine. The free end of the lever 46 is provided with an outturned portion 49 which carries a follower roller 50 adapted to engage the operative surface of the cam 45. A spring 52 fastened to the lever 46 and a fixed stud 53 on the base of the machine serves to hold the roller 50 in operative engagement with the cam.

The cam 45 which serves to regulate the time of operation of all of the movable machine mechanisms is preferably of such a shape that it will cause the grinding wheel to be fed rapidly toward the work for a short period of time until it is about to contact with the work, and thereafter be moved at a slow and uniform rate until the work has been reduced to its approximate size. During the final stage of rough grinding, the feed mechanism is held immovable by a stop mechanism so that the connecting rod 43 may yield if at this time the roller 50 has not reached the point of maximum lift on the cam 45. The return motion of the grinding wheel caused by the abrupt drop on the cam contour releases the tension of spring 52 and turns the feedscrew in the opposite direction to withdraw the grinding wheel rearwardly from the work. The cam 45 is mounted for continuous rotation on a shaft 54 which is suitably journaled in the bearings 55 and 56 in a bracket 57 fastened to the front base of the machine. To positively rotate the cam 45, a worm gear 58 is mounted on the shaft 54 (Fig. 3) in mesh with a worm 59 loosely mounted on the shaft 60. The shaft 60 is supported for rotation in suitable bearing brackets 61 and 62 respectively on the base 10. The shaft 60 may be connected into and out of driving relationship with the worm 59 by means of a suitable clutch mechanism hereafter to be described. The other end of the shaft 60 is operatively connected to a main drive shaft 65 by a gear train 66 which is suitably compounded to produce the desired speed ratio. The main drive shaft 65 is disposed longitudinally of the base 10 for rotation in the bearing brackets 67 and 68 by a pulley 69 and a belt 70 driven from any suitable source of power.

*Table traversing mechanism*

In accordance with the invention, the table 20 may be reciprocated either by hand or power, but in the preferred construction it is arranged to be moved by power in timed relation with the movement of the wheel feeding mechanism. To accomplish this, the mechanism comprises a rotatable shaft 75 which is supported for rotation within a pair of bearing brackets 76 and 77 mounted on the front of an apron plate 78 and fastened to the front of the machine base 10. In order to drive the shaft 75, the drive shaft 65 is rotatably mounted in suitable bearing members 80 and 81 formed on the inner side of the apron plate 78. The shaft 65 carries a pair of gears 82 and 83 secured thereto for rotation between the bearing members 80 and 81. The gear 82 is mounted to mesh with a gear 85 on the shaft 75 and the gear 83 in turn meshing with an idler gear 86 which is in mesh with a gear 87 mounted on the shaft 75. The idler gear 86 is interposed between the gears 83 and 87 and it is mounted on a rotatable shaft 88 supported by the bearing brackets 89 and 90 and fastened to the inner side of the apron plate 78.

In order that the shaft 75 may be driven in either direction, as desired, a clutch member 91 of any well-known construction may be utilized but as shown in the preferred construction, it may comprise a clutch of the multiple disk type having an annular groove 92 formed in the clutch body for the reception of suitable actuating pins mounted in the end portions of the arms of an oscillatable yoke member 97. One arm of this yoke 97 is preferably made longer than the other arm and it has a hub 98 formed integrally therewith whereby it may rock about a stud 99 fastened to the apron plate 78. The upper portion of this yoke member 97 carries an arm 101 which is arranged to be operated by a suitable actuating mechanism hereafter to be described.

In order that the shaft 75 may reciprocate the table 20, a worm 105 which is fixedly mounted on the end of the shaft adjacent to the bearing bracket 76 meshes with a worm wheel 106 on a transversely rotatable shaft 107 and connectible thereto by means of a slidable clutch member 108. The front portion of the shaft 107 is supported for rotation in a bearing 109 integral to the apron plate 78 and has its inner end portion mounted in a bearing 110 carried by an inwardly projecting frame member 112 integral with the apron plate 78. This inner portion of the shaft 107 carries a gear 114 which meshes with a rack 115 fastened to the under side of the table 20. In order to move the table manually, a gear 116 is loosely sleeved on the outer end of the shaft 107 whereby it may be operatively connected to the shaft 107 by means of the clutch member 108. The gear 116 meshes with a pinion 117 which is mounted on a fixed shaft 118 fastened to a bracket 119 and on which it may be rotated by the hand wheel 120. A hand lever 123 pivotally mounted on a bracket 124 carries a yoked member 125 containing suitable actuating pins which engage the annular groove 126 formed in the clutch member 108.

*Work driving and rocking mechanism*

In order that work of irregular contour may be ground, it is desirable to utilize a mechanism whereby the work or the grinding wheel may be moved relative to each other during the grinding operation. In the preferred construction, the work supporting mechanism is so mounted that it may rock toward and from the face of the grinding wheel to produce the desired contour upon the work piece. As shown in the drawings, a rock bar 130 is provided with a pair of trunnions 131 and 132 which project from the opposite ends of the bar and serve to support it for rotation in suitable bearing brackets 134 and 135 mounted on the upper surface of the table 20. The rock bar 130 is provided with a headstock member 137 and a footstock 138 carrying the work supporting centers 139 and 140 respectively which are arranged to support the work piece or product camshaft 141 during the grinding operation. The headstock 137 also carries a driving member 142 adapted to engage a driving dog 143 clamped to one end of the camshaft 141.

In order to move the product camshaft 141 toward and from the grinding wheel to form the desired contour on the work blank, a set of master cams is mounted for rotation with the work piece and each is arranged for engagement with a cam follower carried by the table. To this end, a series of master cams 145 is mounted on a rotatable shaft 146 which carries the driving member 142 and they are arranged for engagement with a slidable master cam follower 147. The follower 147 is slidably keyed on a rotatable shaft 148 which is mounted in the bearings 149 and 150, carried by the webs 151 and 152 respectively depending from the plate 153 which forms the top portion of the casing 154. The shaft 148 is preferably made of heavy construction in order to prevent flexing during the grinding operation.

*Work rotation*

Figure 11:
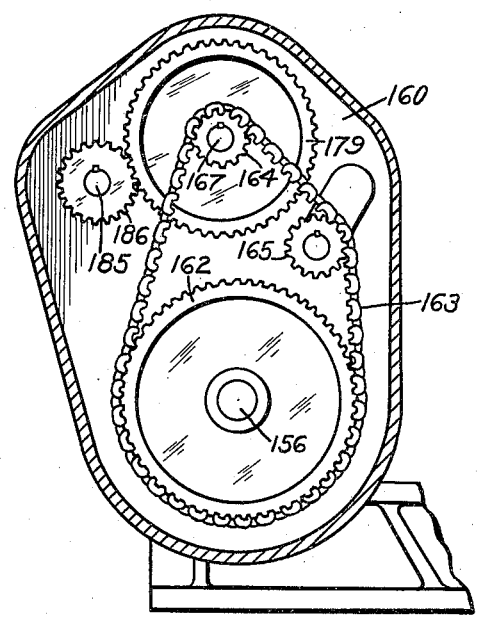
Fig. 11 is a cross-sectional view through the headstock gear casing, taken approximately on the line 11—11 of Fig. 1 showing the chain driving mechanism.

The driving mechanism for rotating the master camshaft and the product camshaft to be ground is shown in the preferred construction as comprising a shaft 155 which is connected to the master camshaft 146 and a shaft 156 by the flexible universal joints 157 and 158 respectively. The shaft 156 is suitably mounted for rotation in a housing 160 which surrounds and encloses the entire driving mechanism. Fastened to the shaft 156 is a sprocket gear 162 (Fig. 11) which is driven by means of a link chain 163 meshing with a driving pinion 164 and an idler gear 165. A shaft 167 supports the pinion 164 on one end thereof and is arranged for rotation within a pair of sleeved members 169 and 170 which are rotatably mounted in a bearing 171 and 172 respectively in the housing 160. Formed on the ends of the sleeve members 169 and 170 are the clutch members 174 and 175 respectively (Fig. 13) which have suitable teeth engageable with others on a movable clutch member 176 slidably keyed to the shaft 167 by means of the key 177. The member 176 is provided with an annular groove 178 which is adapted to be engaged by a suitable actuating member hereafter to be described. Mounted on the other end of the clutch sleeves 169 and 170 are the gears 179 and 180 respectively which are keyed thereto by means of the keys 181 and 182 and these gears provide means for rotating the shaft 167 at the work speeds employed. These gears 179 and 180 may be driven by means of a power device which in the present embodiment comprises an electric motor 183, in which case a cross shaft 185 is provided which is mounted for rotation in suitable bearings formed in the housing 160 on each end of which is mounted the gears 186 and 187 which mesh with the gears 179 and 180 respectively. A worm wheel 188 secured to the shaft 185 is arranged to mesh with a worm 189 mounted on the motor shaft 190.

Actuating mechanism for rock bar

A mechanism is provided to yieldably and successively maintain the respective master cams 145 in peripheral contact with the master cam follower 147. As shown in the drawings, the rock bar 130 is provided with a projecting arm 200, the outer end of which is pivotally connected by means of a pin 201 and a yoke 202 to a rod 203 slidably supported within a cylinder 204. A trunnion 205 serves to support the cylinder to the side of the casing 154. This trunnion mounting of the cylinder permits it to rock as the rock bar is oscillated during the grinding operation. The upper end of the rod 203 is provided with a piston 208 fixed thereto by means of the nut 210 threaded on the end of the rod, the piston being adapted to support the upper end of a spring 212 which surrounds the rod 203 within the cylinder 204. The lower end of the spring is supported by a collar 213 which is fixedly mounted within the cylinder 204 in such a manner as to permit sliding movement of the rod 203 therethrough. The tension of the spring 212 is sufficient to maintain the master cams 145 in peripheral contact with the master cam follower 147 during the grinding operation.

In order that the master cams 145, as well as the product camshaft 141, may be withdrawn from engagement with the follower 147 and the grinding wheel 13 respectively, to permit the shaft 141 to be indexed to move the next cam into operative relation with the grinding wheel and also to permit the cam follower 147 to be indexed into alignment with the succeeding master cam, a mechanism is utilized to rock the bar 130 against the tension of the spring 212. In the preferred construction, a device operated by fluid pressure is provided having a cylinder chamber 215 in the upper end of the cylinder 204. The piston 208 is adapted to slide within the cylinder as the rod moves relative thereto. As fluid under pressure is admitted through the port 216 in the cylinder head 218, the piston is forced downwardly against the tension of the spring 212 to rock the bar 130 and withdraw the master cams 145 and the camshaft 141 from contact with the master cam follower 147 and the grinding wheel 13 respectively. After the table 20 is traversed to bring the next product cam on the camshaft 141 into alignment with the grinding wheel 13, the fluid is discharged from the chamber 215 and the released tension of the spring 212 moves the rod 203 upwardly to rock the bar 130 and the master cams 145 into operative engagement with the master cam follower 147 and the product cams into a grinding position with reference to the grinding wheel 13.

Fluid pressure mechanism

To operate the rock bar cylinder and the table traverse mechanism so as to automatically and simultaneously withdraw the product cams at the proper time and to successively move the product cams opposite the grinding wheel, a fluid pressure mechanism is provided which may be operated in timed relation with the associated mechanisms of the grinding machine. In the preferred construction, a fluid valve mechanism is utilized which is controlled in timed relation with the movement of the wheel feeding mechanism to simultaneously rock the bar 130 and to traverse the table 20 upon the subsequent movement of the wheel away from the work piece. A fluid pressure system is provided which includes a table traverse control valve 220 and a main control valve 221 therefor, the latter of which serves the dual purpose of controlling the fluid flow to the traverse valve 220 and to the rock bar cylinder 204. A fluid tank 222 is provided in the base of the machine and fluid is pumped from this reservoir by a gear pump 223 (diagrammatically illustrated in Figs. 7, 8 and 9). This fluid passes through the pipe 224 into the main control valve 221. This valve (Fig. 14) comprises a cylinder casing 225 and a piston 226 slidably mounted therein and connected by a piston rod 227 and a movable link 228 to an arm 229 depending from a friction clamp 230 mounted on the feed screw 19. The upper and lower members 231 and 232 which compose the clamp are yieldably mounted on the screw 19 by means of the bolts 234 and the springs 235 which permit the clamp 230 to slip on the screw 19 which continues to rotate after the valve piston 226 has reached the end of its travel at either end of the cylinder 225.

Figure 14:
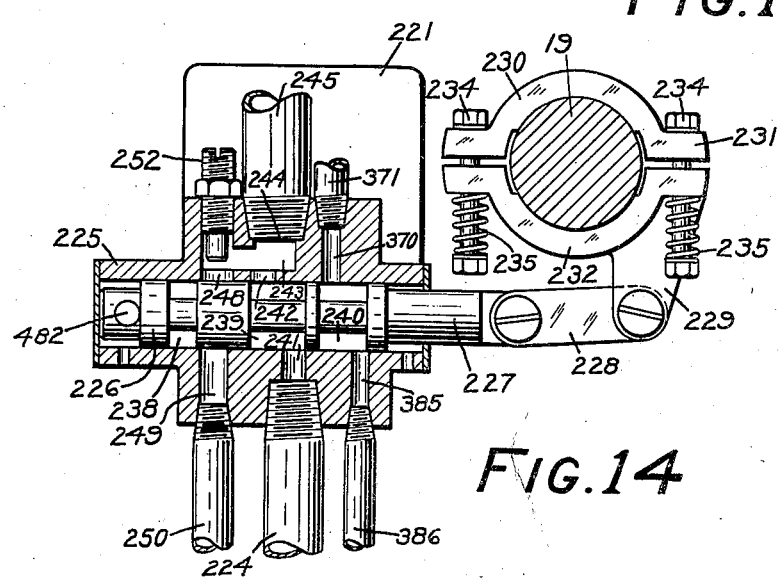
Fig. 14 is a longitudinal sectional view through the operating valve, on an enlarged scale, taken approximately on the line 14—14 of Fig. 5.

In order that the fluid may be admitted to the proper parts, the piston 226 is provided with a series of fluid grooves or valve chambers 238, 239 and 240 respectively. Rotation of the feed screw 19 by the cam 45 to produce a rearward movement of the grinding wheel 13 will cause the control valve mechanism to take the position as shown in Figs. 8, 9 and 14, so that the fluid passes through the pipe 224 and port 241 into the valve chamber 239 in the piston 226. The fluid entering the chamber 239 may then be passed through the port 242 into the chamber 243 through the port 244, and the pipes 245, 246 and 247 to the rock bar cylinder 204 and to the table traverse valve 220 respectively. A change in the direction of rotation of the feed screw to produce a forward feeding of the grinding wheel will cause the parts of the control valve to take the position as shown in Fig. 7, at which time fluid will be exhausted from the chamber 215 of the rock bar cylinder 204 and from the traverse valve 220 through the pipes 246 and 245 respectively, the chamber 243 and the port 248 into the valve chamber 238. The fluid discharging into the chamber 238 may then be passed through the port 249 through the pipes 250 and 251 into the fluid tank 222. The fluid discharging out of the chamber 243 by the port 248 is preferably retarded by means of a check screw 252 in order to give ample time for the rock bar piston 208 to return the rock bar to a grinding position without a sudden impact of follower and the master cams.

To traverse the work table in timed relation with the movements of the rock bar and the wheel, the table traverse valve 220 is provided with an operating valve 261 arranged to actuate the clutch yoke 97 and the arm 101, a reversing valve 262 to change the direction of fluid flow to the operating valve 261, and a pilot valve 263 arranged to shift the operating valve and thereby control the admission of fluid thereto. The admission of fluid to the valve 220 and consequently the valves 261, 262 and 263 is controlled by the main control valve 221. As illustrated the traverse valve 220 is provided with an inlet port 265 which is connected to the main control valve 221 by the pipe 247. The port 265 enters into a valve chamber 269 of the pilot valve 263 in which a piston 267 is slidably mounted therein and connected by a stem 268 to a suitable actuating mechanism, hereafter to be described, which will move the piston to an inoperative position to close the port 265 to shut off the fluid flow to the valves 262 and 261 to stop the traversing movement of the table. The entering fluid from the port 265 may be passed through a fluid chamber 269 in the piston 267 and into a valve chamber 271 of the reversing valve 262 through the port 272. A pin 274 mounted in the plate 78 serves as a stop to limit the stroke of the piston 267. A piston 275 is slidably mounted within the valve 262 and is connected by a piston rod 276 to a control lever 277 which is pivotally supported on a pin 278 secured in a projection of the plate 78. The fluid entering the valve chamber 271 from the port 272 passes into the reverse valve piston 275 and into the cylinder of the operating valve 261. The fluid enters the chambers 281 and 282 of the operating cylinder through either of the ports 283 or 284, depending upon the position of the reverse valve piston 275. The operating valve 261 is provided with a piston 289 of the balanced spring type, which is arranged to slide within the cylinder. A piston rod 285 is provided which is connected by a pin 286 to the clutch arm 101 of the power traverse mechanism. The springs 287 and 288 are located on the respective sides of the piston 289 and serve to return it to a neutral position upon the discharge of the fluid from the operating cylinder.

*Master cam follower index mechanism*

The master cam follower 147 may be moved axially to bring it into alignment with the successive master cams by means of a mechanism, such as illustrated in the U. S. Patent No. 1,783,755 dated December 2, 1930, in which the traversing movement of the table 20 is utilized for moving the follower roller 147 axially in timed relation with the movement of the rock bar 130. The master cam follower is slidably keyed to the shaft 148 and is adapted for axial movement therealong. In order that the follower may be moved in timed relation with the movement of the rock bar, a yoke 290 is provided which engages the side faces of the follower 147 to move it axially. The yoke 290 is arranged for movement by a rack 291 securely mounted on the under portion of the yoke. A cross shaft 292 is mounted in a bearing 293. One end of the shaft 292 is provided with a gear 295 meshing with a gear 296 carrying a pinion 297 integral therewith meshing with the rack 291, and mounted on the stud 298 secured in the bracket 299. By turning the shaft 292, the yoke 290 will move axially along the guide shaft 148 and carry the follower 147 into successive alignment with the master cams. The other end of the shaft 292 is provided with a bevel gear 300 meshing with a bevel gear 301 mounted for rotation in a bracket 302 fastened to the under surface of the table 20. The gear 301 is provided with an elongated hub which is journaled within the bracket 302 and extends beyond the bracket to provide a mount for a sprocket 304 which is fastened thereto. A sprocket 305 is mounted on a longitudinal shaft 306 and it is connected to the sprocket 304 by a link driving chain 307 to drive the gear train. One end of the shaft 306 is supported for rotation in the depending hub 308 carried by the web 309 and formed on the bracket 302. A collar 310 suitably fastened to the shaft 306 prevents endwise motion of the shaft within the hub 308. The other end of the shaft 306 is mounted for rotation in a bracket 315 and it may slide therein so that it may follow the reciprocatory movement of the table.

In order to rotate the shaft 306 the desired amount and in timed relation with the traversing movement of the table, a star wheel 318 is provided which is rotatably mounted on a stud 319 secured to a bracket 320 mounted on the plate 78. The star wheel 318 is positioned and arranged to contact with and be turned by the dogs 321 as the table is reciprocated. The dogs 321, as illustrated in the drawings, are mounted in a T-slot 322 and may be adjusted longitudinally along the slot to vary the spacings to correspond with the spacing of cams on different types of camshafts. Formed integral with the star wheel 318 is a gear 324 which meshes with a gear 325 mounted on one end of a cross shaft 326. The cross shaft 326 is mounted for rotation in the bearing hubs 327 and 328 respectively, carried by the side faces of the base 10. The inner end of the shaft 326 is provided with a bevel gear 329 which meshes with a bevel gear 330 to produce a rotation of the shaft 306. The bevel gear 330 is mounted on the shaft 306 for rotation therewith and it is provided with an elongated hub 331 which is rotatably sleeved within the bearing hub 332. A collar 333 is securely mounted on the end of the hub 331 and serves to prevent endwise movement of the gear 330 within the hub 332. The gear 330 is provided with a key 335 which is arranged to fit within a longitudinal spline 336 in the shaft 306 to permit it to slide within the gear 330 during the reciprocation of the table.

The master cams are equally spaced on the shaft 146 whereas the spacing on the camshaft 141 is irregular. In order that the variable travel of the table may be utilized to uniformly move the star wheel an equal amount, the gearing from the star wheel is such that it will turn the star wheel one division as each dog 321 contacts with it so that a partial rotation of the star wheel will be transmitted through the gearing to slide the follower 147 into alignment with the succeeding master cam. The gears 324, 325, 329 and 330 are of the proper ratio to transmit the required movement to the follower 147.

*Table traverse—stop device*

To stop the traverse of the table 20 and to limit the rotation of the star wheel per indexing movement when the master cam follower 147 is in alignment with the next master cam and with the next product cam opposite the wheel, a suitable stopping device may be utilized which, as illustrated in the drawings, comprises a mechanism connectible with the pilot valve 263 to move it so as to prevent the passage of fluid there-through to the operating cylinder. The preferred construction comprises a pawl 340 pivoted to the bracket 320 by a stud 341. The lower end of the pawl 340 is provided with a formed portion 342 which is adapted to engage the notches in a star wheel 345 integral with the gear 325. A connecting rod 346 is provided having one end pivotally fastened to the lower extremity of the pawl 340 by the stud 347. The other end of the connecting rod 346 is slidably mounted within a hole in the open end of the stem 268 of the pilot valve piston 267. This end of the rod 346 is provided with a recessed portion 350 having a flat surface along which a V-shaped plunger 352 may slide. The recess 350 is provided at its midpoint with a V-groove 353 which is engaged by the V-shaped plunger 352 in a casing 354 formed on a sleeve member suitably fastened on a reduced portion of the stem 268 by means of a set screw. A spring 359 located within the casing 354 serves to yieldably hold the plunger 352 respectively in contact with either the recess surface 350 or the groove 353. The pawl 340 is preferably held yieldably in contact with the star wheel 345 by a spring 360 interposed between the bracket 320 and the pin 362 mounted on the connecting rod 346.

During the grinding operation, the various parts of the main control valve 221 assume the position as shown in Fig. 7 and at this time the wheel will be fed forward with the cam follower 50 climbing the lift of the cam 45. While the valve piston 226 is in this position, fluid is pumped from the tank 222 through the pipe 224 and port 241 into the valve chamber 239 in the piston 226. The port 242 will be closed for this position of the piston so that the fluid entering the chamber 239 may then be passed through the port 370 and the pipe 371 to the pilot valve 263 where it may be admitted through the port 372 in the cylinder head into the chamber 374 formed between the end of the piston 267 and the cylinder head during the movement of the piston. The fluid entering this chamber 374 will move the pilot valve piston 267 to the left until the stem 268 of the piston 267 strikes the pin 274. The piston 267 is now in an operating position with the fluid chamber 269 in proper alignment with the ports 265 and 272 preparatory for the passage of fluid from the pipes 245 and 247 upon the movement of the main control valve piston 226 to the position as shown in Figs. 8 and 14 at the instant the cam follower 50 commences to descend down the surface 376 of the cam 45 from the point of highest lift. At this time the discharge ports 380 and 381, which are provided in the cylinders 262 and 263 respectively, are covered by the piston 267 thereby preventing fluid from escaping through the port 380, the port 381, and into the pipe 384 to the tank 222. At the instant of descent of the cam follower 50 down the surface 376, the cam 45 will produce a counter-rotation of the feed screw 19 to move the wheel rearwardly and the piston 226 to the position as shown in Figs. 8 and 14. Fluid will pass from the pipe 224 and the port 241 through the chamber 239, the port 242, the chamber 243 into the pipe 245 to the pilot valve 263 which now is in the proper position to pass it to the operating cylinder to engage the clutch and traverse the table, as illustrated in Fig. 8. Movement of the piston 267 of the pilot valve 263 by the connecting rod 346, caused by the table traversing movement, closes the port 272 and forces the fluid from the chamber 374 into the pipe 371 where it is discharged from the port 370 through the chamber 240, the port 385, the pipes 386 and 251 into the tank 222. The closing of the port 272 by the piston 267 causes the fluid to be discharged from either the chambers 281 or 282 due to the return of the piston 289 to a neutral position by the springs 287 or 288 respectively, depending on the direction of travel of the table and the position of the piston 275.

*Work speed mechanism*

In order to change the speed of rotation of the master camshaft and product camshaft in order to rotate it at a slower speed during the finish grinding at the time of reversal of the table traverse, a mechanism, such as a fluid pressure cylinder 389, may be employed. In the preferred form, a lever 390 is pivoted to the casing 160 by a stud 392. The upper end of the lever is provided with a yoked portion having arms which straddle the clutch member 176, each arm having a pin 394 which fits into the groove 178 in the member 176 to actuate the member. The lower end of the lever 390 is provided with a depending arm which is adapted to fit into a groove in a spool member carried on the exterior end of a piston rod 398. A piston 399 mounted on the inner end of the rod 398 is slidably mounted for movement within the cylinder 389.

To actuate the piston 399 in timed relation with the table movement, fluid is passed from the chamber 282 of the operating valve 261 through the port 410, the pipe 411, into the chamber 414 in the cylinder 389 of the speed change valve thereby engaging the clutch member 176 with the member 175. On reversal of the table movement by the valve 262, the fluid passes from the chamber 281 of the operating valve through the port 416, the pipe 417, into the chamber 420 of the cylinder 389 and moves the clutch member 176 into the reverse position to rotate the camshaft at a slower speed for finish grinding.

*Wheel feed—stop device*

Figure 15:
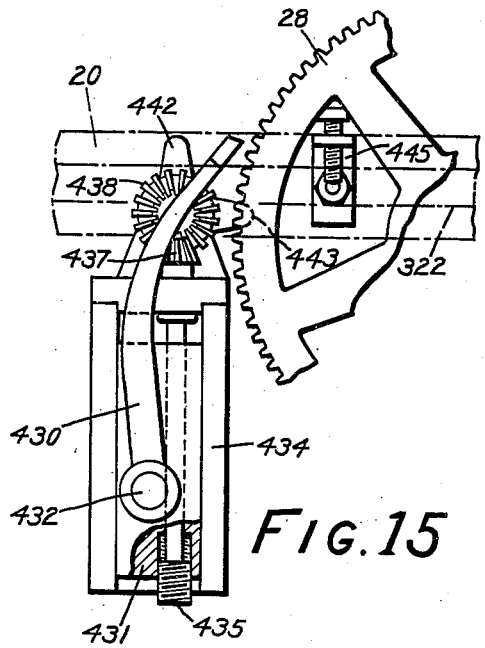
Fig. 15 is a fragmentary front elevation, on an enlarged scale, of the wheel feed stop mechanism.

In order that the wheel may be fed an additional distance into the work blank for the finished size after it has been rough ground to a predetermined size, a suitable device is provided (Fig. 15), which comprises a size stop mechanism including a stop lever arm 430 pivotally mounted on a slide 431 by a stud 432. The slide 431 is mounted in a slide block 434 and is arranged for a sliding movement therein by means of a screw 435. One end of the screw 435 engages a threaded portion in the slide 431. The other end of the screw 435 is provided with a bevel gear 437 which meshes with a bevel gear 438 rotatably mounted on a stud. The other end of the stud supports a star wheel 441 having radially projecting contact fingers 442 and 443 respectively which are arranged to contact with and by the dogs 445 mounted in the T-slot 322 on the table.

As the table 20 approaches the end of its traverse toward the left (Fig. 2) in rough grinding the cams of a camshaft, the dog 445 on the table strikes the finger 442 and through bevel gears 438 and 437 rotates the screw 435 so as to lower the stop lever 430 and thereby permit a further infeeding movement of the grinding wheel while finish grinding the camshaft. When the table 20 approaches the other end of its stroke, a similar dog 445 on the table strikes the finger 443 and turns the gears 438 and 437 and screw 435 in the reverse direction so as to raise the stop lever 430 into its original position for rough grinding the next camshaft.

Automatic cycle stop mechanism

It is desirable in a machine of this type to provide a device which is suitable for stopping the machine automatically after the last product cam blank has been ground to the finished size. To this end (Fig. 16), a lever 450 is pivoted to the base 10 by a stud 451. The upper surface of the lever 450 is provided with a slot into which is mounted an adjustable slide 453 carrying a contact roller 454 engageable by an adjustable dog 455 on the table. This slide 453 is movable along the slot 452 by means of a rack 456 and a pinion 457 rotatable by a knob 458 to enable it to be withdrawn from contact with the dog 455 and thereby allow the clutch to connect the power from the shaft 60 to the machine mechanism. Interposed between the lever 450 and a bell crank lever 460 is a connecting rod 461, one end of which is pivoted to the bell crank by a pin 462. The other end of the rod is connected to the lever 450 by a stud 463. The bell crank lever 460 is pivoted to the bracket by a stud 467. The bell crank lever 460 is provided with an upstanding yoked arm 468 which is provided with pins 469 engaging a groove 470 in a clutch member 471. This clutch 471 is slidably mounted on the drive shaft 60 by means of suitable key connections, as is well known in the art, and is provided with clutch teeth which engage suitable clutch teeth on the worm 59 and are held into engagement by the tension of the spring 475 and furnish the driving connection for the worm 59 from the shaft 60. It can be seen that any downward movement of the lever 450, as produced by the contact of the dog 455 with the roller 454 during the traverse of the table, will rock the bell crank lever 460 and thereby separate the teeth on clutch 471 and the clutch teeth on the worm 59 to stop the rotation of the cam 45 and the other mechanisms of the machine.

Locking device for rock bar

It is desirable to provide a device to lock the rock bar in a raised position with the master cams separated from the master cam follower and the product cams separated from the grinding wheel during the wheel truing operation. This is preferably accomplished by means of a manual locking device (Fig. 17) comprising a locking pin 480 slidably mounted within the valve casing 225 for movement by a hand lever 481 into engagement with a hole 482 in the piston 226 of the main control valve 221 thereby locking the piston 226 in a position where fluid may pass from the pipe 224 through the valve 221 and the pipe 245 into the rock bar cylinder 204 to rock the rock bar 130 away from the master cam roller 147. While the rock bar is in this position, the pilot valve piston 267 will be in the position as shown in Fig. 9 to prevent fluid from entering the pilot valve 262 and the operating valve 261 from the pipe 247.

The pin 480 is provided with a flat portion 483 carrying a pivot pin 484 which is slidably mounted in an elongated slot 485 in one end of a rock arm 486. The arm 486 is pivotally mounted on the projection 487 of the casing 225 by a screw 488 and has an elongated slot 489 formed in the other end which engages a pin 490 carried by a terminal 491 adjustably secured to a connecting rod 492. This rod 492 is interposed between the hand lever 481 and the rock arm 486 to actuate the locking pin 480 at the will of the operator.

Wheel truing

The truing tool may comprise any of the well known truing tools and it may be mounted on the table in any suitable manner to perform the truing operation at the desired time. During the truing operation, the wheel 13 is fed manually toward and from the truing tool at which time the cam 45 is withheld from operative relationship with the feed screw while the table and truing tool are being traversed by means of the hand wheel 120.

Wheel feed connection

In order to prevent breakage of the wheel feeding mechanism due to the changing position of the size stop lever arm 430 and the micrometer device 32, a yieldable connecting rod 43 is provided with (Fig. 2) a chamber 501 into which is mounted a rod 502 and a collar 503 which is fastened thereto by a pin to form a plunger slidable within the chamber 501. Interposed between the bottom of the chamber 501 and the collar 503 is a spring 505 of the proper strength to impart the motion of the rod 502 to the connecting rod 43 and yet allow the collar 503 and the rod 502 to slide in the chamber 501 upon continued motion of the rod 502 when the connecting rod has reached the end of its stroke. The lower end of the rod 502 is connected to the projecting portion 49 of the follower device by a pin 508. The other end of the rod 502 is provided with an enlarged head 511 slidable in a recessed portion formed in the rod 43. A slot is provided in the top portion of the rod 43 into which the lower arm of the bell crank 41 is pivoted on a pin 516.

Operation

The operation of the mechanism will be apparent from the foregoing description. The product camshaft 141 is rotatably mounted on centers 139 and 140 between the headstock 137 and the footstock 138 and is driven by a driving member 142. The grinding wheel 13 is fed towards the camshaft 141 by the continuously rotating cam 45 and its associated members to roughly grind the product cam to the approximate size as limited by the size stop lever 430. At this time, the cam follower roller 50 is being lifted slowly by the cam contour (Fig. 7) until it reaches the point of maximum lift on the cam 45. When this point is reached, the micrometer device 32 will be in contact with the size lever 430 to prevent further feeding movement of the wheel and thereby allow it to grind the cam blank to the approximate size. At this time, the sector gear 410 is at the end of its travel so that breakage would occur if movement were continued in that direction. Such a condition would arise if at this time the cam follower roller 50 failed to reach the point of highest lift on the cam 45 at the same instant that the micrometer device 32 contacted with the stop 430. For this reason, it is necessary to use a yieldable connecting rod 43 which is so constructed as to permit the rod 502 and collar 503 to slide so as to compress the spring 505 to compensate for the additional movement of the roller 50.

As the master camshaft 146 is rotated to drive the camshaft 141, it also rocks the bar and the product camshaft 141 toward and from the grinding wheel to produce the desired contour on the product cam. Motion of the roller 50 down the slope 376 from the point of highest lift (Fig. 8) serves to revolve the sector gear 410 in a counter direction to rotate the feed screw 19 to move the grinding wheel 13 from operative contact with the product cam. Simultaneously with this change in the direction of movement of the screw 19, the friction clamp 230 is moved through a small arc thereby sliding the main control valve piston 226 to the position as shown in Figs. 8 and 14. Fluid will pass from the pipe 224 through the chambers 239 and 243 into the pipes 245, 246 and 247 respectively to the operating valve 261 and the rock bar cylinder 204 to rock the bar 130 and move the master camshaft 146 and the product camshaft 141 out of operative relation with the master cam roller 147 and the grinding wheel respectively. At this time, the table 20 is traversed by power to the next cam station which brings the master cam roller 147 into alignment with the next master cam and the succeeding product cam into alignment with the grinding wheel. Movement of the table 20 causes the dog 321 thereon to contact with the star wheel 318 and enter a notch in the wheel 318 thereby turning the star wheel through a partial revolution so as to move the gears 324, 325, 329, 330, 301, 300, 295, 296 and 297 and the rack 291 a proportionate amount to index the master cam roller axially into alignment with the next master cam. Simultaneously with the rotation of the star wheel 318, the star wheel 345 will be rotated by the gear 325 through the same angular distance, at which time the portion 342 of the pawl 340 will enter a notch of the star wheel 345 due to the action of the spring 360 thereby causing the rod 346 to slide in the pilot valve stem 268 to the left, as shown in Fig. 9, until the plunger 352 is pressed into the V-groove 353. When this occurs, the star wheel 345 will have been indexed through one complete notch and the portion 342 forced therefrom to push the pilot valve piston 267 to the position as shown in Fig. 9 thereby preventing fluid from passing through the pilot valve to the operating valve so that the piston 289 will spring back to a neutral position and disengage the power from the table traverse mechanism thereby stopping all traversing movement of the table.

By this time, the cam roller 50 will have reached the lowest point on the contour of the cam 45 (Fig. 9) with motion impending to cause it to climb the ascending cam lift to feed the grinding wheel forward toward the work. At the instant at which the cam roller 50 starts to rise, due to the rising contour of the cam 45, motion will be imparted to the connecting rod 43 and the sector gear 40 to rotate the feed screw 19 to feed the grinding wheel in a forward direction. This rotation will swing the friction clamp 230 to move the main control piston 226 back to its former position as shown in Fig. 7 to close the main control valve ports 241 and 242 and prevent fluid from entering the pipe 245. The position of the valve is such that the chamber 239 is moved opposite the ports 241 and 370 so that fluid may pass from the pipe 224 into the pipe 371 and to the chamber 374 to move the pilot valve piston 267 along the rod 346. This movement will force the plunger 352 out of the V-groove 353, as shown in Fig. 7, thereby moving the chamber 269 opposite the entrance ports 265 and 272 and in readiness for the admission of fluid from the pipe 247 upon the movement of the main valve piston 226 to permit fluid flow from the pipe 224 to the pipes 245 and 247. This cycle is repeated for each product cam until the last one is reached. When the last product cam has been roughly ground to size and shape, the power traversing movement of the table 20 will be continued in the same direction and in the same manner as for the cam stations, until an adjustable dog 520, mounted thereon in the T-slot 322 on the table 20 strikes the lever 277 of the reverse valve 262 and carries it to the position shown in Fig. 1, thereby moving the piston 275 and the valve chamber 271. This movement of the piston will permit fluid at the proper time to enter the chamber 281 to actuate the operating valve piston 289 to traverse the table 20 in the opposite direction and thereby reverse the grinding order of the product cams during the finishing operation. While the dog 520 is changing the position of the reverse valve lever 277, the movement of the table 20 prior to reversal is sufficient to carry the dog 445 into contact with the contact finger 442 of the size stop mechanism to rotate the gears 438 and 437 through a partial turn. Movement of the gear 437 turns the screw 435 a like amount to lower the slide 431 in the slide block 434 and thereby drop the stop lever arm 430 to permit an additional feeding of the wheel 13 into the product cams to grind them to the desired finished size. During the finishing operation, the subsequent movements of the various valve mechanisms will follow in the same order and will function identically as they did during the previous roughing operations and take the same relative positions with the exception of the operating valve 261 and the work speed cylinder 389. At this time, fluid is supplied to the chambers 281 and 420 respectively, instead of to the chambers 282 and 414, as was done during the roughing operation, so that the work rotation will be slower.

When the last product cam is ground to the finished size, the dog 455 will strike the roller 454 thereby depressing the lever 450 and disengaging the clutch member 471 from the worm 59 to automatically stop the machine. At this time, the rotation of the cam 45 will be stopped but the drive shaft 60 will continue to rotate freely without operatively moving any machine mechanisms. If it is so desired, the operator may completely stop the rotation of the shaft 60, by moving the hand lever 64 to a neutral position thereby disconnecting the clutch 63 from driving relationship with the shaft 60. The work rotation is stopped by the operator by means of a suitable device on the motor which is thrown by the operator when the grinding has been completed. The rotation of the work ceases and the operator removes the work piece from the supporting centers.

Having thus described the invention, what is claimed as new and desired to secure by Letters Patent is:

1. A cam grinding machine comprising a rotatable grinding wheel, means to rotate a camshaft having a plurality of spaced cams thereon in operative relation to said wheel, means to intermittently traverse the shaft in one direction and successively position said cams opposite to the grinding wheel, means to automatically feed the grinding wheel toward the camshaft for grinding said cams, and means actuated automatically after all of the cams have been traversed past the wheel to reverse the direction of traverse and intermittently and successively position said cams again opposite to the grinding wheel for a further grinding operation.

2. A cam grinding machine for grinding a camshaft having a plurality of spaced cams thereon according to claim 1 in which the cams are successively rough ground while the shaft is traversed in one direction and are successively finish ground while the shaft is traversed in the opposite direction, comprising an automatically actuated mechanism to stop the machine after the finish grinding operation is completed.

3. A cam grinding machine for grinding camshafts having a plurality of spaced cams thereon, according to claim 1, in which a multi-speed work rotating mechanism is arranged to rotate the work first at a rough grinding speed and then at a finish grinding speed.

4. A cam grinding machine for grinding camshafts having a plurality of spaced cams thereon, according to claim 1, in which a multi-speed work rotating mechanism is arranged to rotate the camshaft at one speed for a preliminary grinding, and automatic means actuated after a predetermined preliminary grinding operation to actuate said mechanism and rotate the camshaft at a second speed for further grinding operation.

5. A grinding machine comprising a rotatable grinding wheel, a transversely movable wheel slide to support said wheel, a longitudinally movable work table on said base, means to automatically traverse said table in either direction, means including a two-speed work rotating mechanism on said table, and means actuated automatically at the end of the table traverse to change the speed of work rotation.

6. A grinding machine comprising a grinding wheel, a work table traversable past the grinding wheel, means on said table to rotatably support the work, mechanism for reciprocating the table in both directions, and means operated in timed relation with the reversal of direction of table movement to cause the work to rotate at one speed while the table is traversing in one direction and at another speed when the table reverses its movement.

7. A machine of the type covered by claim 1 comprising means for rotating the camshaft at a given rate while the camshaft is being traversed in one direction for a rough grinding operation and means for causing the camshaft to rotate at a slower rate for a finish grinding operation while the camshaft is being traversed in the opposite direction.

8. A grinding machine comprising a base, a grinding wheel rotatably mounted thereon, a work table reciprocable past the wheel, means for reciprocating said table in both directions, means including a multi-speed mechanism to rotate a work piece at rough and finish grinding speeds, and automatically actuated mechanism to change the speed of rotation of the work from a rough grinding to a finish grinding speed.

9. A grinding machine comprising a rotatable grinding wheel and a work support which are movable relatively toward and from each other, a feeding mechanism to cause said relative movement, a traversing mechanism to cause a relative longitudinal movement between said wheel and work in both directions, means including a multi-speed mechanism to rotate a work piece at rough and finish grinding speeds, and automatically actuated mechanism to change the work speed from a rough grinding to a finish grinding speed.

10. A grinding machine comprising a base, a grinding wheel rotatably mounted thereon, a work table reciprocable past the wheel, mechanism for reciprocating the work table in both directions, a multi-speed mechanism for rotating the work piece mounted on said table, and means actuated in timed relation with the table movement for changing the speed of the work rotation when the work has reached a predetermined position.

11. A grinding machine for grinding a work piece at a plurality of spaced stations comprising a base, a reciprocable work table mounted thereon, a grinding wheel movable towards and from the work, mechanism for reciprocating the table intermittently for positioning the work in operative relation to said work stations successively, a multi-speed work rotating mechanism including a speed control device and means operated automatically when the table has reached the end of its stroke in one direction to actuate said control device and change the speed of work rotation for grinding the work during movement of the table in the opposite direction.

12. A grinding machine for grinding a work piece at a plurality of spaced stations comprising a base, a grinding wheel and a work support which are relatively traversable to locate the wheel opposite each of said stations, a multi-speed work rotating mechanism including a speed control device and means operated automatically at the end of each traversing stroke in one direction to move said control device and change the speed of work rotation for grinding the work during the traversing movement in the opposite direction.

13. A grinding machine comprising a base, a grinding wheel, a support for a work piece having a plurality of grinding stations, mechanism for relatively moving the work and grinding wheel toward and from each other to grind the work at a given station to a predetermined size, a multi-speed mechanism for rotating the work during the grinding operation, power actuated mechanism for relatively moving the work and wheel longitudinally in either direction to position the wheel successively at each grinding station, and means acting automatically to change the speed of work rotation after the grinding wheel has operated on the work piece at all of said stations and so that the work will rotate at a slower rate during a second operation of successively grinding the work at said stations.

14. A grinding machine comprising a base, a grinding wheel, a pivotally mounted support for a work piece having a plurality of grinding stations arranged to rock toward and from the wheel, mechanism to rock said support, mechanism for feeding the work and the grinding wheel relatively toward and from each other to grind the work at a given station to a predetermined size, a multi-speed mechanism for rotating the work during the grinding operation, power actuated mechanism for relatively moving the work and the wheel in either direction to position the wheel successively at each grinding station, and automatic means to change the speed of work rotation after the completion of a grinding operation at all of the stations, whereby the work may rotate at a slower rate as the wheel successively performs a second grinding operation at each of said stations.

15. A grinding machine comprising a base, a grinding wheel rotatably mounted thereon, a work table reciprocable past the wheel, power mechanism for reciprocating the work table in both directions, a multi-speed power mechanism including a clutch for rotating the work piece mounted on the table, and a fluid pressure device actuated in timed relation with the table movement for changing the speed of the work rotation when the work table has reached a predetermined position.

16. A grinding machine comprising a base, a grinding wheel rotatably mounted thereon, a work table traversable past the grinding wheel, power mechanism for reciprocating the work table in both directions, a multi-speed power mechanism for rotating the work piece mounted on said table, a fluid pressure actuated mechanism including a clutch for automatically changing the rate of work rotation from one speed to the other, means for feeding the grinding wheel toward and from the work, and means cooperating in timed relation with the wheel feed movement to operate the fluid pressure device and control the speed of work rotation.

17. A grinding machine comprising a base, a grinding wheel slide movably mounted thereon, a rotatable grinding wheel on said slide, a work support, means to traverse said work support longitudinally relative to the work, a cross feed mechanism including a stop for moving the wheel slide forward to a predetermined position to effect a grinding operation, and means actuated automatically in timed relation with the traversing movement of the work support to move said stop to a second position after the grinding wheel has made a rough grinding cut and thereafter permit a further movement of the grinding wheel forward to effect a finish grinding operation.

18. A grinding machine comprising a base, a work table reciprocably mounted thereon, a grinding wheel, a slide therefor movable towards and from the work table, cross feed mechanism including an adjustable stop for moving the wheel to a predetermined position to effect a grinding operation, mechanism for reciprocating the table, and means operated when the table has reached a predetermined position to move said stop to a second position and permit the grinding wheel to feed into the work to a further extent.

19. A grinding machine comprising a base, a reciprocable table, a grinding wheel, a slide therefor movable toward and from the work table, cross feed mechanism including an adjustable stop for moving the wheel to a predetermined position to effect a grinding operation, power mechanism for reciprocating the table, and means operated by and cooperating with the table when the table has reached a predetermined position to automatically adjust said stop from one position to a second position to permit the grinding wheel to feed into the work to a further extent.

20. A grinding machine for grinding work having a plurality of grinding stations, a reciprocable work table, a grinding wheel, a wheel slide therefor movable towards and from the work table, power actuated mechanism to cause the grinding wheel to traverse the work at each station successively, cross feed mechanism including a stop which causes the grinding wheel to feed into the work at each station to a predetermined extent for rough grinding, and means operated automatically in timed relation with the table movement to move said stop to a second position so as to permit a further feeding of the wheel into the work when the table has reached the extent of its movement thereafter and effect a second series of grinding cuts at each station for finishing the work.

21. A cylindrical grinding machine comprising a base, a work support movable longitudinally thereon, a rotatable grinding wheel movable towards and from each other, means to traverse the table longitudinally relative to the work, a power actuated mechanism to feed said wheel towards and from the work, means including an adjustable stop to limit the movement of the grinding wheel towards the work, and means operated in timed relation with the table traversing movement to position said stop to limit the forward movement of the wheel when the table is traversed in one direction for rough grinding and to reposition said stop to permit an additional movement forward to feed the wheel when the table is traversed in the opposite direction to finish grind the work.

22. A machine of the type covered by claim 1 comprising means for automatically feeding the wheel forward and into the work for rough grinding the cams while they are being traversed in one direction and means for causing the wheel to be fed into the work to a further predetermined extent for a finish grinding operation when the cams are being traversed in the opposite direction.

23. A cylindrical grinding machine comprising a base, a rotatable grinding wheel and a work support which are movable relatively towards and from each other, means to traverse said support longitudinally relative to the work, a cross feed screw and nut connected to cause such feeding movement, a power actuated mechanism including a cam and a follower operatively connected to rotate the feed screw in both directions through a predetermined angular distance, means including an adjustable stop to limit the relative movement of the grinding wheel and work towards each other, and means operated in timed relation with the table movement to position said stop to limit the forward movement of the grinding wheel when the table is traversed in one direction for rough grinding and to re-position said stop to permit an additional movement forward to feed the wheel when the table is traversed in the opposite direction to finish grind the work.

24. A cam grinding machine having a base, a rotatable grinding wheel movable transversely on the base, a camshaft support arranged to move a camshaft longitudinally to bring successive cam blanks into operative relation with the grinding wheel, said support being arranged for lateral movement towards and from the grinding wheel, means including a set of master cams and a follower to move the cam blanks and produce a predetermined contour thereon, power mechanism to traverse said cam blank support, means for locking the support in an inoperative position against engagement with a master cam and to render said power mechanism ineffective for traversing the support while it is in the locked position, and means independent of said power mechanism to manually traverse said camshaft support longitudinally while said support is in a locked position.

25. A grinding machine comprising a base, a work table slidably mounted thereon, a grinding wheel slide movable transversely toward and from the work table, a grinding wheel mounted on said slide, a fluid pressure device for moving the work and grinding wheel relatively away from one another, power actuated mechanism including a clutch for moving the work table longitudinally in either direction, a fluid pressure operated control device for actuating said clutch, and fluid pressure means operating in timed relation with said relative feeding movement of the work and wheel to actuate said control device and cause the table to move longitudinally when the work and wheel are out of contact.

26. A grinding machine comprising a base, a work table longitudinally movable thereon, a grinding wheel, a fluid pressure device for moving the work and the wheel relatively towards and from each other, power actuated mechanism including a controlling clutch for moving said table, fluid pressure actuated mechanism for moving the clutch, and valve mechanism for controlling the fluid flow to said fluid pressure devices and cause separation of the work and wheel and the table traverse to operate in timed relation to each other.

27. A grinding machine comprising a base, a grinding wheel slide mounted thereon for movement toward and from the work, a grinding wheel rotatably mounted on said slide, a work table movable longitudinally thereon to a succession of grinding stations, power mechanism including a clutch for traversing said table, a fluid pressure device including a piston and cylinder to automatically actuate said clutch, means including a cross feed screw and nut for moving the wheel slide, a main control valve mechanism for controlling the fluid pressure to said fluid pressure device to cause the table traverse mechanism to operate in timed relation with the wheel feed movement, and means actuated by the table movement to shut off the fluid flow to said fluid pressure device to stop the table movement when it has traversed to a predetermined extent.

28. A grinding machine comprising a base, a grinding wheel slide mounted thereon for movement toward and from the work, a grinding wheel rotatably mounted on said slide, a work table movable longitudinally thereon to a succession of grinding stations, power mechanism including a clutch for traversing said table, a fluid pressure device including a piston and cylinder to automatically actuate said clutch, means including a cross feed screw and nut for moving the wheel slide, a main control valve mechanism for controlling the fluid pressure to said fluid pressure device to cause the table traverse mechanism to operate in timed relation with the wheel feed movement, and a fluid valve intermittently actuated by and in timed relation with said table movement to actuate said fluid pressure device and cause the clutch to disconnect said power mechanism and thereby stop the table movement at predetermined grinding stations.

29. A grinding machine comprising a base, a grinding wheel slide mounted thereon for movement toward and from the work, a grinding wheel rotatably mounted on said slide, a work table movable longitudinally thereon to a succession of grinding stations, means including a cross feed screw and nut for moving the slide, a power mechanism including a clutch for traversing said table, a fluid pressure system including a piston and cylinder to automatically actuate said clutch, a pilot valve to control the fluid flow to said cylinder, a reversing valve to reverse the direction of fluid flow to said cylinder to move said clutch into the reverse position to cause the table to traverse in the opposite direction, and a main control valve mechanism for controlling the fluid flow to said pressure system to cause the table traverse to operate in timed relation with the wheel feed movement.

30. A grinding machine comprising a base, a grinding wheel slide mounted thereon for movement toward and from the work, a grinding wheel rotatably mounted on said slide, a work table movable longitudinally thereon to a succession of grinding stations, power mechanism including a clutch for traversing said table, a fluid pressure device including a piston and cylinder to automatically actuate said clutch, a pilot valve to control the fluid flow to said cylinder, automatic mechanism for moving the wheel slide toward and from the work, a valve mechanism for controlling the flow of fluid to said fluid pressure device to cause the table traverse to operate in timed relation with the wheel feed movement and means actuated by the table to simultaneously reset the pilot valve to an operative position and to stop the table traverse.

31. A cam grinding machine having a rotatable grinding wheel movable transversely of the base, a table movable longitudinally on said base, power mechanism to traverse said table, a camshaft support arranged to move a camshaft longitudinally to bring successive cam blanks into operative relation with the grinding wheel, said support being arranged for lateral movement toward and from the grinding wheel, means including a set of master cams and a follower to control the lateral movement of the cam blank support during grinding so as to produce a predetermined contour on the cam blanks, means including a star wheel operated in timed relation with the table movement to index said follower opposite the successive master cams, a fluid pressure mechanism including a pilot valve to actuate said power mechanism and move the table, and means operated in timed relation with the table movement and controlled by said star wheel yieldably connected to the pilot valve for intermittently checking the fluid flow to said fluid pressure mechanism and thereby stopping the power traverse of the work table as each blank is successively positioned in operative relation with the grinding wheel.

32. A cam grinding machine comprising a rotatable grinding wheel, a work table reciprocated past the grinding wheel, a pivotally mounted support on the table for a camshaft having a plurality of spaced cam blanks which is arranged for movement toward and from the wheel, means to feed the wheel toward and from the work, means including a set of master cams and a follower to produce relative movement between the support and the wheel to control the contour of said blanks, power mechanism for traversing the table to successively position each blank in operative relation with the grinding wheel, mechanism operated in timed relation with the table movement to automatically index the cam follower into operative relation with the master cam corresponding with the cam blank to be ground, a fluid pressure device including a pilot valve to actuate said power mechanism in timed relation with the wheel movement, a star wheel, a lever yieldably connected to said pilot valve and actuated by said star wheel to intermittently stop the fluid flow to said fluid pressure device and thereby stop the table at a predetermined grinding position, and adjustable dogs on the table which serve to actuate said star wheel and to simultaneously index the cam follower into operative relation with the master cam corresponding with the cam blank to be ground and to actuate the pilot valve to stop the table movement.

CHARLES G. TREFETHEN.
ALBERT G. BELDEN.